F. J. GOSMEYER.
STAKE AND STAKE HOLDER.
APPLICATION FILED MAR. 29, 1921.
1,411,429.
Patented Apr. 4, 1922.
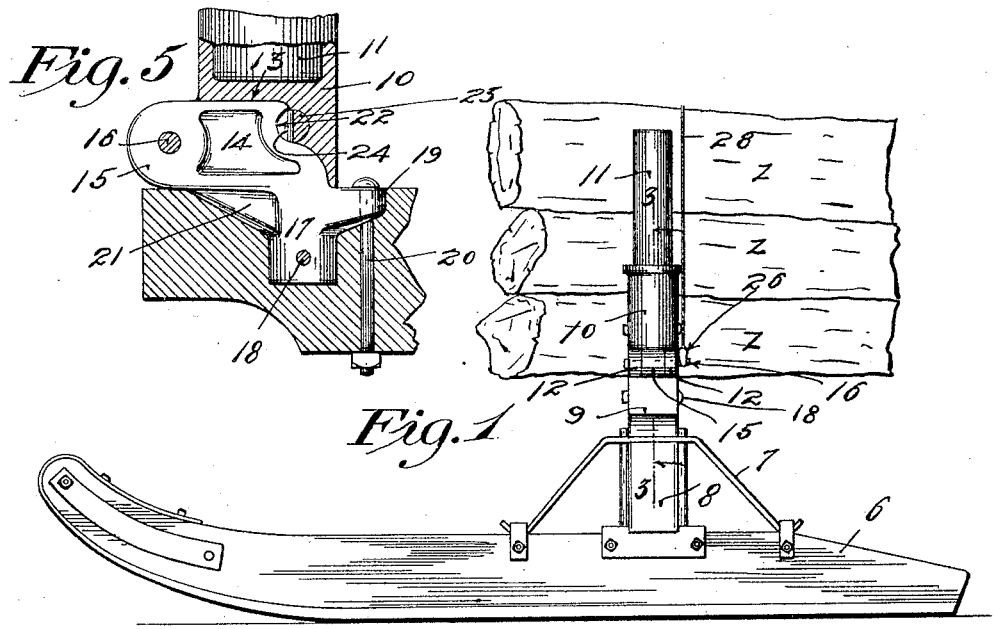
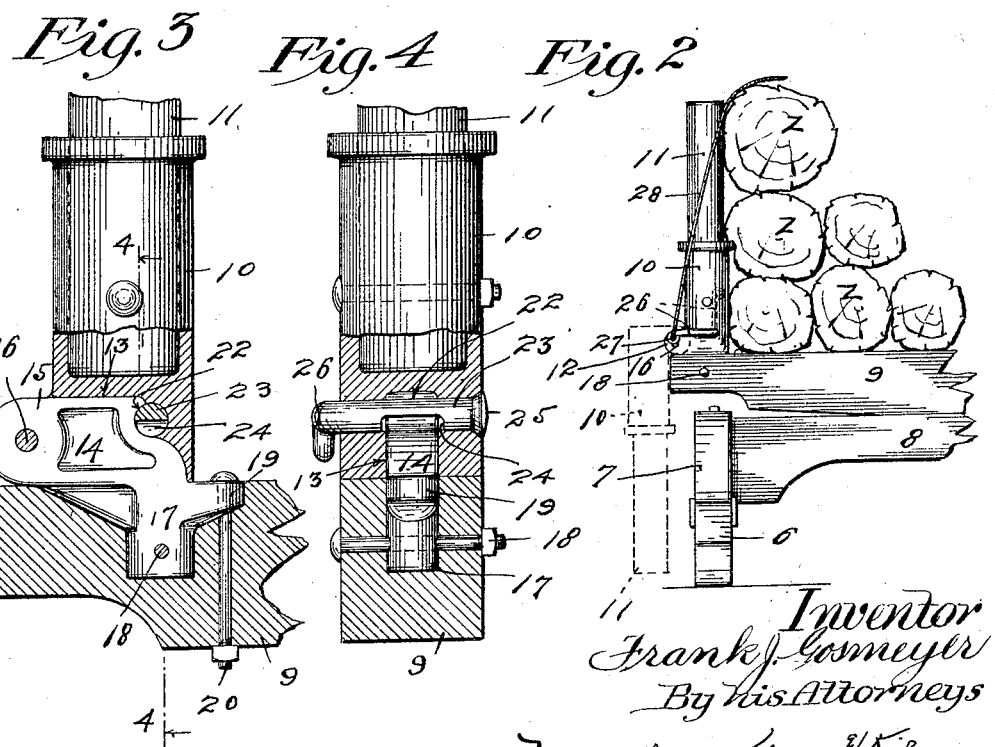
Inventor
Frank J. Gosmeyer
By his Attorneys
Merchant, Kilgor & Kilgor

UNITED STATES PATENT OFFICE.

FRANK J. GOSMEYER, OF CLEAR LAKE, MINNESOTA.

STAKE AND STAKE HOLDER.

1,411,429.　　　Specification of Letters Patent.　　Patented Apr. 4, 1922.

Application filed March 29, 1921. Serial No. 456,584.

*To all whom it may concern:*

Be it known that I, FRANK J. GOSMEYER, a citizen of the United States, residing at Clear Lake, in the county of Sherburne and State of Minnesota, have invented certain new and useful Improvements in Stakes and Stake Holders; and I do hereby declare the following to be a full, clear, and exact description of the invention, such as will enable others skilled in the art to which it appertains to make and use the same.

My invention has for its object to provide an extremely simple and highly efficient stake and stake holder adapted for use in connection with bob sleds, cars and the like.

To the above end, generally stated, the invention consists of the novel devices and combinations of devices hereinafter described and defined in the claims.

In the accompanying drawings, which illustrate the invention, like characters indicate like parts throughout the several views.

Referring to the drawings:

Fig. 1 is a fragmentary view in side elevation showing the front portion of a bob sled having the invention embodied therein;

Fig. 2 is a rear elevation of the parts shown in Fig. 1, with some parts shown in different position by means of broken lines;

Fig. 3 is a fragmentary detail view with some parts sectioned on the line 3—3 of Fig. 1, on an enlarged scale;

Fig. 4 is a detail view with some parts sectioned approximately on the line 4—4 of Fig. 3; and Fig. 5 is a view corresponding to Fig. 3, with the exception that the lock bolt has been turned into a releasing position.

For the purpose of illustrating the invention applied in working position, there is illustrated in the drawings the front sled of a bob sled, and of the parts thereof, it is important to note the runner 6, knee 7, beam 8 and bolster 9.

The improved stake, as shown, is made in two parts and includes a socket member 10 which removably holds a post 11, but, in some instances, it might be desirable to make the stake as an entirety. Formed with the lower end of the socket member 10 is a pair of laterally spaced radially offset hinge lugs 12, between which and said socket member is a recess 13. The stake holder, as shown, is in the form of a bracket 14, which rests on the upper face of the bolster 9, is fitted into the recess 13 and terminates, at its outer end, in a hinge lug 15, which extends between the hinge lugs 12 and is connected thereto by an offset pivot pin 16.

Formed with the bracket 14, at the inner end thereof, is a depending shank 17, which fits in a bore in the bolster 9 and is connected thereto by a transverse bolt 18. Integrally formed with the shank 17 is an inwardly offset anchor lug 19 fitted in a recess in the upper face of the bolster 9 and is connected to said bolster by a vertical bolt 20. The shank 17 is further connected to the bracket 14 by a web 21 fitted in a recess in the bolster 9.

In the inner end of the bracket 14, over the shank 17, is a lock shoulder 22 adapted to receive a horizontal lock bolt 23 rotatably mounted in the socket member 10 to hold the stake in an upright or working position, as shown in Figs. 3 and 4. To release the stake from the bracket 14 and permit the same to swing on the pivot pin 16 into an inoperative position outward of the ends of the bolster 9, the lock bolt 23 is provided with a notch 24 arranged to be brought into registration with the lock shoulder 22 and clear the same by rotating said lock bolt into a position as shown in Fig. 5. On one end of the lock bolt 23 is a head 25, and on the other end thereof is a radial operating arm 26 having in its free end an eye 27, to which is attached a rope 28 by which said arm may be lifted and thereby rotate said lock bolt into an inoperative position. Obviously, the head of the bolt 25 and its arm 26 hold the same against endwise movement in the stake or removable therefrom.

As shown, a load of logs Z is held on the bolster 9 by the improved stake, and the weight of the arm 26 is such as to hold the lock bolt 23 rotated into interlocking engagement with the lock shoulder 22, and the downward movement of said arm is limited by an extended end of the hinge pin 16, which acts as a stop therefor. By lifting the arm 26 into position as indicated by broken lines in Fig. 2, the lock bolt may be rotated into a position to bring its lock notch 24 into registration with the lock shoulder 22 and thereby permit the stake to swing outward and downward, as indicated by broken lines in Fig. 2. The weight of the logs Z on the post will swing the same outward as soon as it is released from the lock bolt 23. It is important to note that the hinge connection between the stake and stake holder is such that said stake will swing downward over the end of the bolster 9 and thereby protect said bolster and also the stake from damage by rolling logs or any other load thereover. By throwing the rope 28 over the logs Z, the stakes may be released by an operator standing on the opposite side of the bob sled therefrom, so as to be out of danger from being hurt by the rolling logs.

While the posts 11 are shown of such length as to swing vertically downward outward of the bob sled, it might be desirable, in some instances, to make these posts of sufficient length, so that the outer ends thereof will rest on the ground or other support whereby the stakes may be used as skids for rolling logs or any other load onto the bob sled or therefrom. When loading a sled, the stakes may be moved into inoperative position so that the majority of the logs will not have to be lifted thereover, thus saving a great deal of labor. The locking device for the stake has great strength and the outward pressure of the load or logs on the stake will securely hold the lock bolt 23 interlocked with the lock shoulder 22. In some instances, it might be desirable to provide the bolster with a second bracket 14 located inward of the one illustrated, so that the stake could be shifted thereto when used on wide bob sleds to hold a box or rack made for a narrow bob sled. To shift the stake from one bracket to the other, it will only be necessary to remove the hinge pin 16.

The above described invention, while extremely simple and of comparatively small cost to manufacture, is thought to be highly efficient for the purpose had in view and does away with the customary log chain and more securely holds a load. In some instances, it might be desirable to provide a plurality of aligned stakes having a single lock bolt with a releasing notch for each lock shoulder, whereby the stakes may be simultaneously released by operating said lock bolt.

The word "bolster" is herein used in a broad sense to cover a beam or other support to which the stakes may be attached.

What I claim is:

1. The combination with a bolster, of a bracket on the bolster, a stake pivoted to the bracket, and a lock bolt rotatable on the stake and movable into one position to engage the bracket and hold the stake in working position and into another position to release the same.

2. The combination with a bolster, of a bracket on the bolster, a stake pivoted to the bracket for movement from an upright working position over the bolster to a depending position outward of the end of the bolster, and a lock bolt rotatable on the stake and movable into one position to engage the bracket and hold the stake in its working position and into another position to release the same.

3. The combination with a bolster, of a bracket on the bolster having a lock shoulder, a stake pivoted to the bracket, and a lock bolt rotatable on the stake for movement into one position to engage the lock shoulder on the bracket to hold the stake in working position and into another position to release the same.

4. The combination with a bolster, of a bracket on the bolster having a lock shoulder, a stake connected to the bracket by a pivot offset outward of the lock shoulder, and a lock bolt mounted on the stake for movement into one position to engage the lock shoulder to hold the stake in working position and into another position to release the same.

5. The combination with a bolster, of a bracket on the bolster having a lock shoulder, a stake pivoted to the bracket, and a lock bolt rotatably mounted in the stake and yieldingly held in an operative position for interlocking engagement with the lock shoulder to hold the stake in working position.

6. The combination with a bolster, of a bracket on the bolster having a lock shoulder, a stake pivoted to the bracket, and a lock bolt rotatably mounted in the stake and yieldingly held in an operative position, said lock bolt being arranged to engage the lock shoulder during a movement of the stake to working position to be moved thereby into an inoperative position to pass said lock shoulder and thereafter automatically move into interlocking engagement with the lock shoulder to hold the stake in working position.

7. The combination with a bolster, of a bracket on the bolster having a lock shoulder, a stake pivoted to the bracket, and a lock bolt rotatably mounted in the stake and arranged to engage said lock shoulder and hold the stake in working position, said lock bolt being provided with a notch arranged to be brought into registration with said lock shoulder and render the lock bolt inoperative.

8. The combination with a bolster, of a bracket having a shank mounted in a bore in the bolster and also having an outwardly offset hinge lug, a bolt extending transversely through the bolster and shank, and a stake having an outwardly offset hinge lug pivoted to the hinge lug of said bracket.

9. The combination with a bolster, of a bracket having a shank mounted in a bore in the bolster and also having an outwardly offset hinge lug and an inwardly offset anchor lug, a bolt extending transversely through the bolster and shank, a second bolt extending vertically through the bolster and anchor lug, and a stake having an outwardly offset hinge lug pivoted to the hinge lug of said bracket.

In testimony whereof I affix my signature.

FRANK J. GOSMEYER.